No. 626,777. Patented June 13, 1899.
H. SLOTTERBECK.
COLLAPSIBLE SNAG HOOK FOR FISHING.
(Application filed Mar. 10, 1899.)
(No Model.)
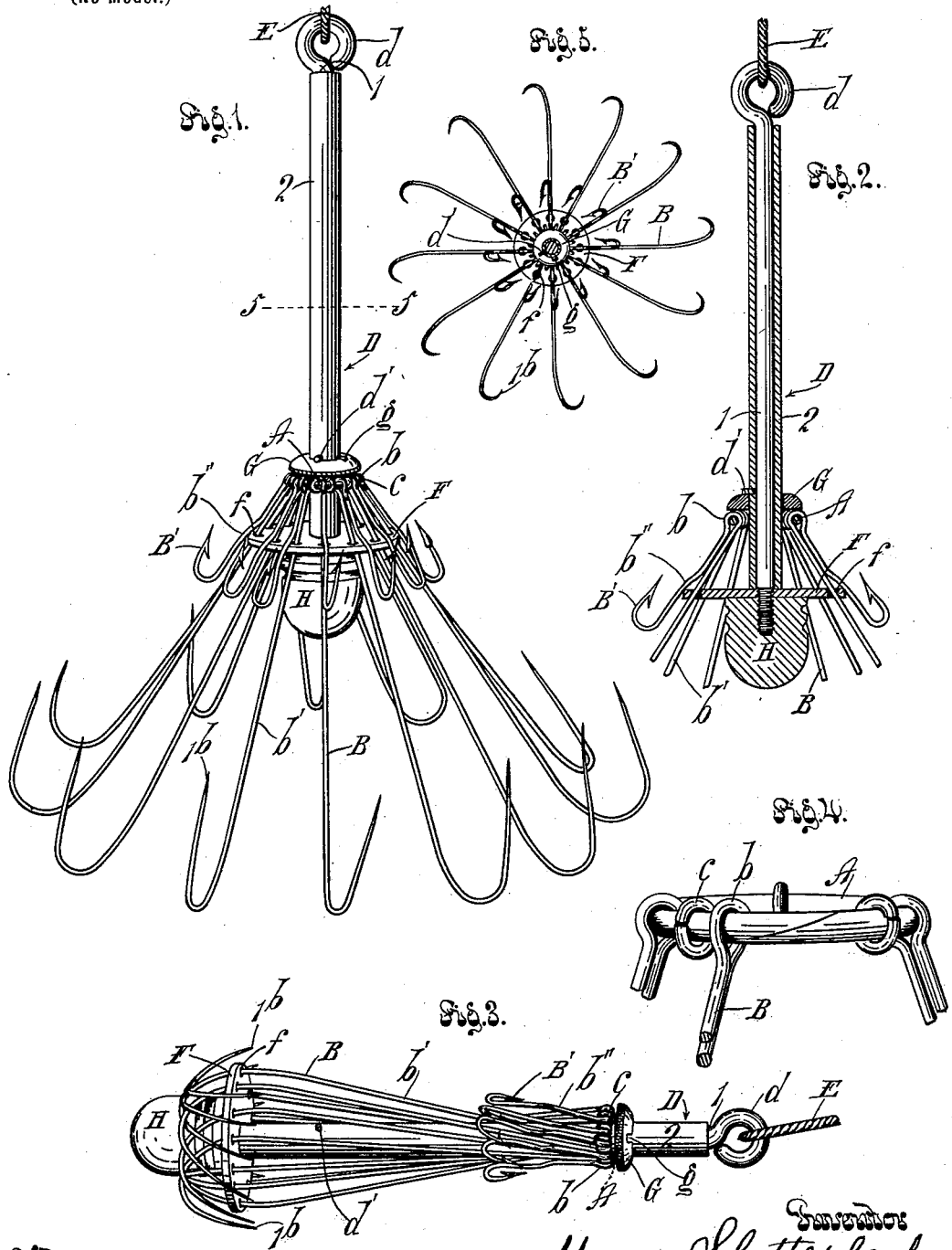

UNITED STATES PATENT OFFICE.

HENRY SLOTTERBECK, OF LOS ANGELES, CALIFORNIA, ASSIGNOR OF ONE-HALF TO GEORGE WALTER SLOTTERBECK, OF SAME PLACE.

COLLAPSIBLE SNAG-HOOK FOR FISHING.

SPECIFICATION forming part of Letters Patent No. 626,777, dated June 13, 1899.

Application filed March 10, 1899. Serial No. 708,569. (No model.)

*To all whom it may concern:*

Be it known that I, HENRY SLOTTERBECK, residing at Los Angeles, in the county of Los Angeles and State of California, have invented a new and useful Collapsible Snag-Hook for Fishing, of which the following is a specification.

My invention relates to a fishing device which is provided with a plurality of hooks having their points set outward and upward, so that when the device is jerked upward it will catch any fish which may be in the way of the hooks.

An object of my invention is to provide a snag-hook which can be collapsed into a small compass, so that it can be conveniently carried and without danger from the hooks.

Another object of my invention is simplicity of construction.

Another object is to provide the snag-hook with bait-hooks at the least expense and in such a manner that they will not be in the way in opening and closing the snag-hooks.

The accompanying drawings illustrate my invention.

Figure 1 is a perspective view of my snag-hook ready for snagging fish. Fig. 2 is a fragmental vertical mid-section of Fig. 1. Fig. 3 is a perspective view of my newly-invented snag-hook collapsed. Fig. 4 is a perspective view of the hook-carrying ring with a portion of the hooks and washers thereon. A number of the hooks and washers are omitted for clearness of illustration. Fig. 5 is a plan section on line 5 5, Fig. 1.

A indicates a ring on which are hung a plurality of hooks B. Preferably the ring is a split ring run through the eyes $b$ of the hooks, with washers $c$ interposed between the eyes of the hooks to hold them apart and to hold the hooks in position with points outward.

D indicates a stem to work through the ring and provided at the lower end with guides, through which the hooks play.

$d$ indicates an eye at the top of the stem, to which the line E is fastened.

F indicates a guide-head, preferably consisting of a perforated plate fastened to the lower end of the stem.

$f$ indicates guide-holes in the guide head or plate. The hooks play through these holes, the margins of which form the guides for the shanks of the hooks. Said hooks are set with their points outward and upward, preferably in a circle outside the guide-plate. The play of the ring on the stem is preferably great enough to allow the shanks of the hooks to be drawn up through the guides until the bends of the hooks are brought into their guides, respectively, thereby bringing the points $1^b$ of the hooks close to the guide-plate, which is preferably circular, as shown. The guide-holes are preferably arranged in a circle nearly twice the diameter of the ring, and the guide-holes are preferably sloped inward from both sides, so that when the ring is slipped down toward the plate the shanks will slope outward at an angle of forty-five degrees, more or less. In order to increase the collapsible feature, the points of the hooks are deflected from a radial line in one direction, so that when collapsed the hooks nest with each other, as shown in Fig. 3.

In order to lock the hook in its set position, as shown in Figs. 1 and 2, the stem is provided with a projection, as the pin $d'$, and a locking-collar G is loosely mounted on the stem D above the ring and is provided with a notch $g$, through which the pin $d'$ can pass. The ring A is large enough to pass the pin $d'$, and when the ring has been brought down into the set position the collar can be brought down below the pin $d'$ and then turned, so that the pin engages the collar and prevents it from moving back up the stem, and this holds the ring down and prevents the snag-hook from collapsing.

The stem is preferably formed of a rod 1 and a tube 2, through which the rod is passed. The rod is screw-threaded at its lower end to screw into the guide-plate F, and the tube 2 extends from the guide-plate to the eye $d$ when the plate is screwed home. When the rod is screwed home into the plate F, its lower end preferably projects through the guide-plate and a weight H is screwed onto the projecting end of the rod and against the guide-head, thus serving the double purpose of a set-nut for the plate and also as a sinker for the snag-hook.

The snag-hook is preferably provided with bait-hooks, which are arranged at the upper ends of the shanks of the main hooks. I deem it preferable to make the main hook and the bait-hook therefor of one piece of wire, as shown in the drawings. In this construction the upper end of the shank $b'$ of the main hook is bent to form the eye $b$, through which the split ring is to be run, and the wire is then brought down to form the shank $b''$ of the bait-hook B'. The hooks are made of spring-wire, and the shank of the bait-hooks is sprung against the shank of the main hook, so as to press upon the guide-head when the snag-hook is set. This assists in holding the main hook in position, with point outward, as shown.

Preferably the snag-hooks are without barbs and the bait-hooks are provided with barbs; but either of the hooks can be made with or without barbs, as desired. It is to be understood that any suitable form of hook can be used without departing from the spirit of my invention.

In practical use the collapsed snag-hook is opened into set position by grasping the eye $d$ and moving the ring A toward the guide-head plate. As the ring approaches the guide-plate the hooks are thrown to spread outward, and when fully set they are held rigidly with their points set upward and outward and at angles with the radii of the snag-hooks, as indicated in Fig. 5. Then the locking-collar is brought down, with the notch $g$ in position to allow the projection $d'$ to pass therethrough, after which the collar is turned so that the notch does not register with the projection, and the snag-hook is then ready for use. The bait will then be placed on the bait-hooks, and the snag-hook is dropped into the water. When the fish, attracted by the bait, begin to nibble at the same, the fisherman will jerk the snag-hook up, thus snagging the game and drawing it out of the water.

To collapse the snag-hook, the locking-collar is released by turning it to bring the notch $g$ into position to pass the projection $d'$ and the main hooks are pressed upward, thus closing the snag. The ring is loose upon the stem, so that it partially rotates at the close of the upward movement of the hooks, and when the bends of the hooks are in the guides the shanks will lie spirally around and close to the stem and the points of the hooks will be brought close to the circular guide-plate, so that the snag-hook is brought into a very compact and comparatively harmless form.

The washers $c$ are preferably open rings of wire, which can be bent onto and unbent from the open ring A. In assembling the snag-hook the hooks may first be run onto the ring, and then washers can be run onto the ring between the hooks, respectively, until the split can no longer be opened. Then the remainder of the washers will be bent into place on the ring.

If any of the hooks become broken, they can be readily replaced by first unscrewing the weight H. Then the stem is unscrewed from the guide-plate, and then a sufficient number of the washers $c$ are unbent and removed from the ring to leave a space to allow the split ring to be opened to release or replace the hook.

Now, having described my invention, what I claim as new, and desire to secure by Letters Patent, is—

1. A collapsible snag-hook comprising a ring; a plurality of hooks hung on the ring; a stem to work through the ring and provided at the lower end with guides through which the shanks of the hooks play, said hooks being set with points outward and upward and the ring being arranged to play loosely upon the stem whereby the points of the hooks may be thrown outward beyond the guides and on a reverse movement, drawn inward toward the guides through which the shanks play.

2. A collapsible snag-hook comprising a ring, a plurality of hooks hung on the ring, a stem to work through the ring and provided at the lower end with guides through which the hooks play, said hooks being set with points outward and upward, and the play of the ring on said stem being sufficiently great to allow the bends of the hooks to be brought into their guides.

3. A collapsible snag-hook comprising a ring, a plurality of hooks hung on the ring, a stem to work through the ring and provided at the lower ends with guides through which the hooks play, said hooks being set with points outward and upward and deflected from radial lines in one direction and the play of the ring on the stem being sufficiently great to allow the bends of the hooks to be brought into their guides.

4. The combination of a perforated guide-head with perforations circularly arranged therein and a central screw-threaded hole; a stem screwed into the screw-threaded hole; a ring to play on the stem; and hooks with shanks in the guide-perforations and with eyes hung upon the ring.

5. A collapsible snag-hook comprising a guide-plate with central screw-threaded hole therein; guide-perforations arranged around the hole; a stem screwed into the guide-head and provided with a projection; a ring to play upon such stem and over the projection; hooks hung upon the ring and with their shanks in the guide-perforations and with their points projecting upward and outward; and a locking-collar to slide and turn upon the stem and provided with a notch to pass the projection of the stem.

6. A snag-hook comprising a guide-head; a stem screwed through the guide-head and projecting therefrom; a weight screwed onto the projecting end of the stem to form a set-nut for the plate; a ring to work upon the stem; and hooks hung upon the ring and with their shanks extending through the guide-head.

7. A snag-hook comprising a guide-plate; a stem projecting therefrom; a ring to play upon the stem; and a plurality of combined main and bait hooks each formed of a single piece of wire bent around the ring and with the shank of the main hook extending through the guide and the shank of the bait-hook arranged to press upon the rim of the guide-plate when the hook is set.

HENRY SLOTTERBECK.

Witnesses:
   JAMES R. TOWNSEND,
   F. M. TOWNSEND.